United States Patent
Park et al.

(10) Patent No.: US 10,157,152 B2
(45) Date of Patent: Dec. 18, 2018

(54) SEMICONDUCTOR DEVICE INCLUDING A GLOBAL BUFFER SHARED BY A PLURALITY OF MEMORY CONTROLLERS

(71) Applicants: SK hynix Inc., Icheon (KR); INDUSTRY-ACADEMIC COOPERATION FOUNDATION, YONSEI UNIVERSITY, Seoul (KR)

(72) Inventors: Kihyun Park, Seoul (KR); Su-Hae Woo, Seoul (KR); Sungho Kang, Seoul (KR)

(73) Assignees: SK HYNIX INC., Icheon (KR); INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 196 days.

(21) Appl. No.: 14/863,132

(22) Filed: Sep. 23, 2015

(65) Prior Publication Data

US 2016/0154750 A1 Jun. 2, 2016

(30) Foreign Application Priority Data

Dec. 2, 2014 (KR) ........................ 10-2014-0170641

(51) Int. Cl.
*G06F 12/00* (2006.01)
*G06F 13/16* (2006.01)
*G06F 3/06* (2006.01)
*G06F 13/42* (2006.01)
(Continued)

(52) U.S. Cl.
CPC .......... *G06F 13/1673* (2013.01); *G06F 3/068* (2013.01); *G06F 3/0626* (2013.01); *G06F 3/0644* (2013.01); *G06F 3/0658* (2013.01); *G06F 3/0659* (2013.01); *G06F 12/0862* (2013.01); *G06F 13/4234* (2013.01); *G06F 2212/6022* (2013.01); *H04L 49/9005* (2013.01)

(58) Field of Classification Search
CPC ........................ G11C 11/4093; G06F 12/0862
See application file for complete search history.

(56) References Cited

U.S. PATENT DOCUMENTS

2004/0260908 A1* 12/2004 Malik ................. G06F 12/0862
711/213
2007/0064500 A1* 3/2007 Harmsze ............... G06F 12/084
365/189.05
(Continued)

FOREIGN PATENT DOCUMENTS

KR 10-2007-0012857 A 1/2007
KR 10-2011-0127193 A 11/2011

OTHER PUBLICATIONS

Razvan Cheveresan et al., "Characteristics of Workloads Used in High Performance and Technical Computing," 21$^{st}$ ACM International Conference on Supercomputing, Jun. 18-20, 2007, pp. 1-10, Seattle, WA.

(Continued)

*Primary Examiner* — Arvind Talukdar

(57) ABSTRACT

A semiconductor device includes a plurality of memory controllers each of which includes a local buffer, a global buffer coupled to the plurality of memory controllers and including areas respectively allocated to the plurality of memory controllers, and a global buffer controller that controls sizes of the allocated areas of the global buffer.

11 Claims, 13 Drawing Sheets

(51) Int. Cl.
*G06F 12/0862* (2016.01)
*H04L 12/861* (2013.01)

(56) References Cited

U.S. PATENT DOCUMENTS

2008/0183959 A1* 7/2008 Pelley ............... G06F 12/0862
                                              711/109
2015/0046656 A1* 2/2015 Blinick ............. G06F 12/0848
                                              711/129

OTHER PUBLICATIONS

Jiang Lin et al., "DRAM-Level Prefetching for Fully-Buffered DIMM: Design, Performance and Power Saving," National Science Foundation, 2007, pp. 94-104, IEEE.

Santhosh Srinath et al., "Feedback Directed Prefetching: Improving the Performance and Bandwidth-Efficiency of Hardware Prefetchers," 2007, pp. 63-74, IEEE.

Ibrahim Hur et al., "Feedback Mechanisms for Improving Probabilistic Memory Prefetching," 2008, pp. 443-454, IEEE.

Chongmin Li et al., "Priority Based Fair Scheduling: A Memory Scheduler Design for Chip-Multiprocessor System," 3rd JILP Workshop on Computer Architecture Competitions (JWAC-3): Memory Scheduling Championship (MSC), Jun. 9, 2012, pp. 1-6.

Takakazu Ikeda et al., "Request Density Aware Fair Memory Scheduling," In 3rd JILP Workshop on Computer Architecture Competitions: Memory Scheduling Championship, MSC, 2012, pp. 1-6.

Keisuke Kuroyanagi et al., "Service Value Aware Memory Scheduler by Estimating Reqeust Weight and Using per-Thread Traffic Lights," 3rd JILP Workshop on Computer Architec-ture Competitions (JWAC-3): Memory Scheduling Championship (MSC), Jun. 2012, pp. 1-6.

Young-Kuk Moon et al., "The Compact Memory Scheduling Maximizing Row Buffer Locality," 3rd JILP Workshop on Computer Architecture Competitions (JWAC-3): Memory Scheduling Championship (MSC), Jun. 9, 2012, pp. 1-6.

Kun Fang et al., "Thread-Fair Memory Request Reordering," In 3rd JILP Workshop on Computer Architecture Competitions: Memory Scheduling Championship, MSC, 2012, pp. 1-6.

* cited by examiner

FIG. 11

| PREFETCH HIT RATE(PE) | RATIO OF WRITE BUFFER AREA | RATIO OF PREFETCH BUFFER AREA |
|---|---|---|
| 85% < PE ≤ 100% | 4/8 | 4/8 |
| 50% < PE ≤ 85% | 5/8 | 3/8 |
| 25% < PE ≤ 50% | 6/8 | 2/8 |
| PE ≤ 25% | 7/8 | 1/8 |

SEMICONDUCTOR DEVICE INCLUDING A GLOBAL BUFFER SHARED BY A PLURALITY OF MEMORY CONTROLLERS

The present application claims priority under 35 U.S.C. § 119(a) to Korean Patent Application Number 10-2014-0170641, filed on Dec. 2, 2014, in the Korean Intellectual Property Office, which is incorporated herein by reference in its entirety as set forth in full.

BACKGROUND

1. Technical Field

Embodiments of the present disclosure relate to a semiconductor device including a plurality of memory controllers. Particularly, embodiments of the present disclosure relate to a semiconductor device including a global buffer which can be dynamically allocated to a plurality of memory controllers.

2. Related Art

A Hybrid Memory Cube (HMC) technology, including a plurality of memory cell dies and a logic die for controlling the plurality of memory cell dies, has been developed.

FIG. 1 illustrates an HMC device. The HMC includes a plurality of memory cell dies 10 and a logic die 20.

Each of the memory cell dies 10 is divided into a plurality of cell partitions 11, and the logic die 20 is divided into a plurality of logic partitions 21. Each of the cell partitions 11 may include a plurality of banks.

When the memory cell dies 10 and the logic die 20 are vertically stacked, cell partitions 11 of the memory cell dies 10 and a logic partition 21 of the logic die 20, each disposed at corresponding locations, may exchange signals through a through-silicon via (TSV) that penetrates the memory cell dies 10 and the logic die 20.

A set of the cell partitions 11 and the logic partition 21 disposed at the corresponding location is called a vault 31. The logic partition 21 operates as a memory controller that controls the cell partitions 11 in the same set, and will be referred to as a memory controller or a vault controller hereinafter.

The HMC may include a plurality of vaults 31, and each of the vaults 31 may independently operate.

In a conventional HMC device, a vault controller includes resources such as a write buffer and a prefetch buffer in order to control memory cells in a vault, but these resources are not shared by another vault controller.

Therefore, for a specific memory vault, performances of operations such as a read operation, a write operation and the like may be deteriorated when a vault controller corresponding to the specific vault includes insufficient resources.

SUMMARY

Embodiments of the present disclosure relate to a semiconductor device that includes resources sharable by a plurality of memory controllers and dynamically controls the allocation of the resources to the memory controllers, thereby improving performance when read and write operations are performed on a specific vault.

In one embodiment of the present invention, a semiconductor device includes: a plurality of memory controllers each of which includes local buffer; a global buffer coupled to the plurality of memory controllers and including areas respectively allocated to the plurality of memory controllers; and a global buffer controller that controls sizes of the allocated areas of the global buffer.

The semiconductor device according to the present technology includes resources sharable by a plurality of memory controllers and dynamically allocates the resources according to operation states of each memory controller, thereby improving its own performance.

Furthermore, the present disclosure provides a hybrid buffer obtained by integrally forming different types of buffers such as a write buffer and a prefetch buffer as resources useable in a memory controller, and variably adjusts the capacity of each buffer in the hybrid buffer according to a read request and a write request, thereby improving the performance of the semiconductor device.

BRIEF DESCRIPTION OF THE DRAWINGS

Features, aspects, and embodiments are described in conjunction with the attached drawings, in which:

FIG. 11 is a graph showing an example of variably adjusting capacity of a local buffer of FIG. 7.

DETAILED DESCRIPTION

Figure 1:
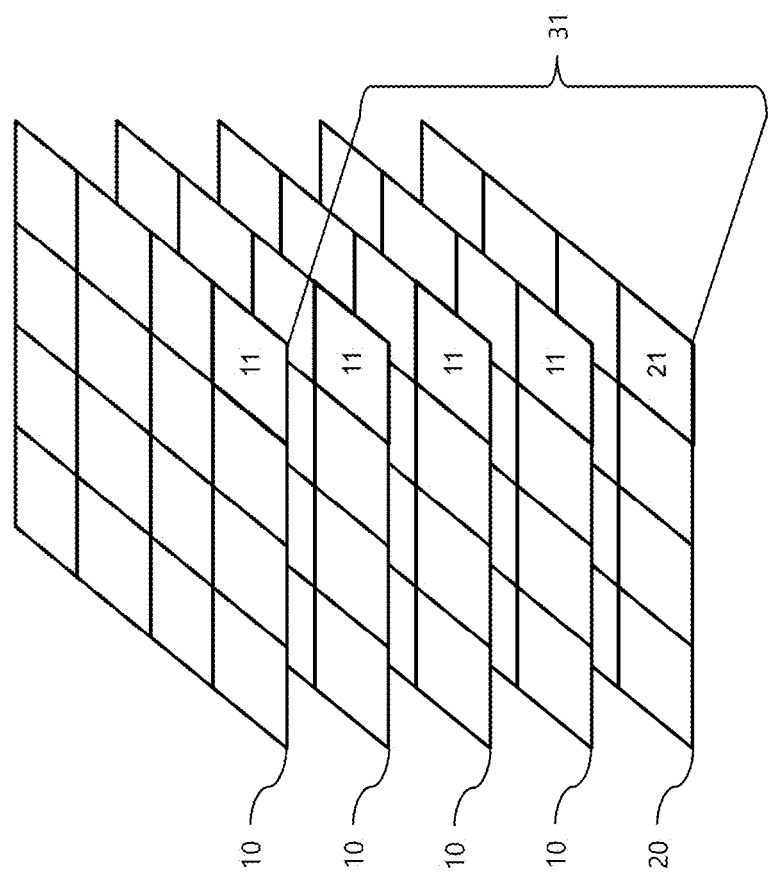
FIG. 1 illustrates an HMC device.

Hereinafter, embodiments of the present disclosure will be described in detail with reference to the accompanying drawings. In the following description, the same reference numerals are used to designate substantially the same elements.

Figure 2:
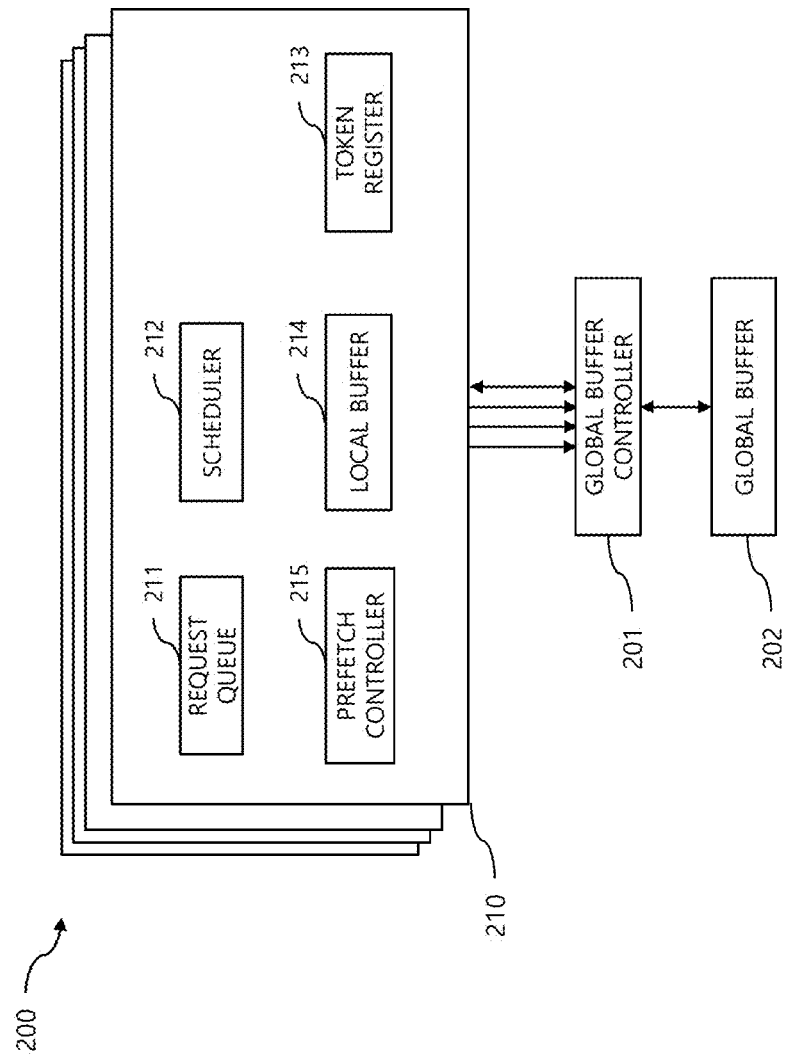
FIG. 2 is a block diagram of a semiconductor device according to an embodiment of the present disclosure.

FIG. 2 is a block diagram of a semiconductor device 200 according to an embodiment of the present disclosure.

The semiconductor device 200 includes a plurality of vault controllers (or memory controllers) 210, a global buffer 202, and a global buffer controller 201.

In the present embodiment, each of the vault controllers 210 controls read and write operations for a memory cell in a corresponding vault.

Each of the vault controllers 210 includes a request queue 211, a scheduler 212, a token register 213, a local buffer 214, and a prefetch controller 215.

The request queue 211 stores a plurality of read and write requests inputted to the vault controller 210. The scheduler 212 decides a processing order of the plurality of read and write requests stored in the request queue 211. The scheduler 212 controls a read or write operation for a memory cell in the corresponding vault in response to a request selected, according to the processing order, from the read and write requests stored in the request queue 211.

The token register 213 stores information on a portion of the global buffer 202 that can be allocated to the vault controller 210. For example, the token register 213 stores a token value assigned to the vault controller 210. The token value is associated with a size of the portion of the global buffer 202, which can be allocated to the vault controller 210. The token value of the vault controller 210 may be dynamically adjusted by the global buffer controller 201.

The local buffer 214 is a buffer designated to the vault controller 210. In the present embodiment, the local buffer 214 is used to store prefetch addresses and prefetched data, which are both associated with a prefetch operation.

The prefetch controller 215 controls a prefetch operation. The prefetch operation is an operation for reading data from a memory cell before a read request is processed in the vault controller 210, thereby quickly processing the read request in the vault controller 210 when the read request is selected according to the processing order. The prefetch operation is a well-known technology.

The scheduler 212 may process a prefetch request generated by the prefetch controller 215 while read and write requests provided from an external device are not processed.

As a result, if the data corresponding to the read request provided from the external device exists in (hits) the local buffer 214 when processing the read request selected according to the processing order, the vault controller 210 reads and outputs the data stored in the local buffer 214 without accessing the memory cell. That is, if the prefetched data stored in the local buffer 214 corresponds to the read request, the vault controller 210 outputs the prefetched data externally, in order to reduce a processing time of the read request.

The prefetch controller 215 may analyze addresses corresponding to the read requests stored in the request queue 211, generate a prefetch request for reading data corresponding to an address (e.g., a prefetch address), perform the prefetch request to read the data from a memory cell selected by the prefetch address, and store the read data in the local buffer 214 as prefetched data.

In the present embodiment, if there is insufficient space in the local buffer 214, the prefetch controller 215 allows prefetch addresses and prefetched data to be stored in an allocated space in the global buffer 202.

At this time, the prefetch controller 215 may provide information, such as prefetch addresses, prefetched data, and vault information, to the global buffer controller 201, and the global buffer controller 201 may store the information provided from the prefetch controller 215 in an area of the global buffer 202 that is allocated to the vault controller 210.

In the present embodiment, the global buffer 202 performs a function of expanding the capacity of the local buffer 214 of the vault controller 210, so that a structure of the global buffer 202 is substantially the same as that of the local buffer 214.

Figure 3:
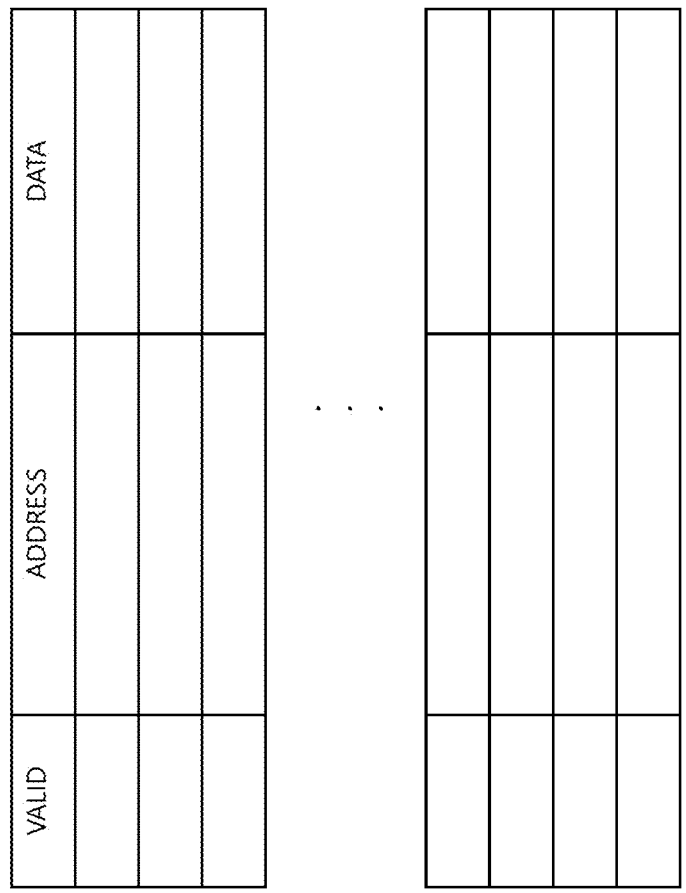
FIG. 3 illustrates a data structure of a local buffer of FIG. 2.

FIG. 3 illustrates a data structure of the local buffer 214 of FIG. 2. The data structure of the local buffer 214 includes a plurality of rows, each of which includes a valid field VALID, an address field ADDRESS, and a data field DATA.

The valid field VALID stores information about whether a corresponding row is valid, the address field ADDRESS stores a prefetch address, and the data field DATA stores prefetched data.

Figure 4:
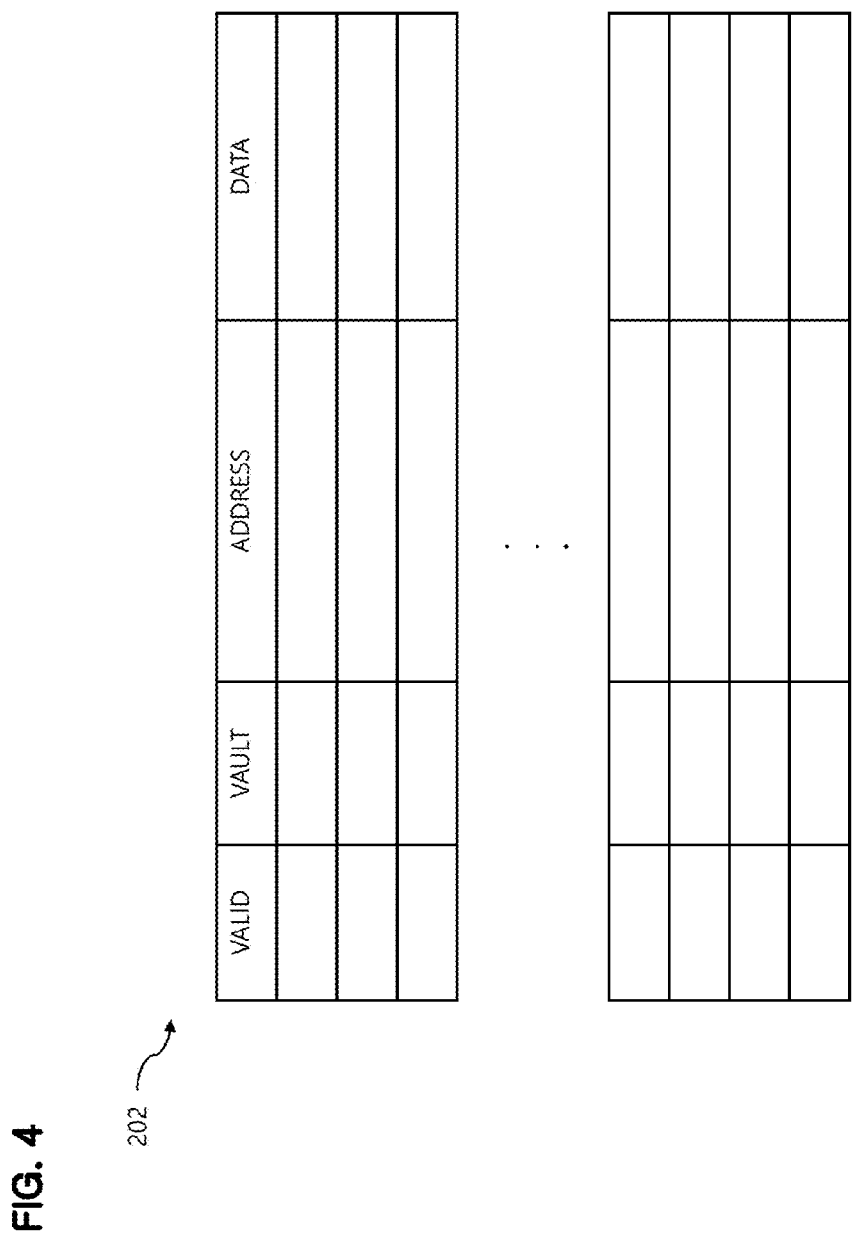
FIG. 4 illustrates a data structure diagram of a global buffer of FIG. 2.

FIG. 4 illustrates a data structure of the global buffer 202 of FIG. 2. The data structure of the global buffer 202 is substantially the same as that of the local buffer 214.

Therefore, the global buffer 202 includes a plurality of rows, each of which includes a valid field VALID, an address field ADDRESS, and a data field DATA. The data structure of the global buffer 202 further includes a vault field VAULT indicating a vault to which a corresponding row has been allocated.

The global buffer controller 201 dynamically adjusts a size of an allocated portion of the global buffer 202 allocated to each vault controller 210, with reference to the size of the allocated portion of the global buffer 202 and a size of a used portion of the global buffer 202 actually used by each vault controller 210.

At this time, the size of the allocated portion of the global buffer 202 may be indicated by a token value and may be stored in the token register 213.

The size of the used portion of the global buffer 202 actually used by each vault controller 210 may be calculated with reference to the vault field VAULT and the valid field VALID in the data structure of FIG. 4.

Figure 5:
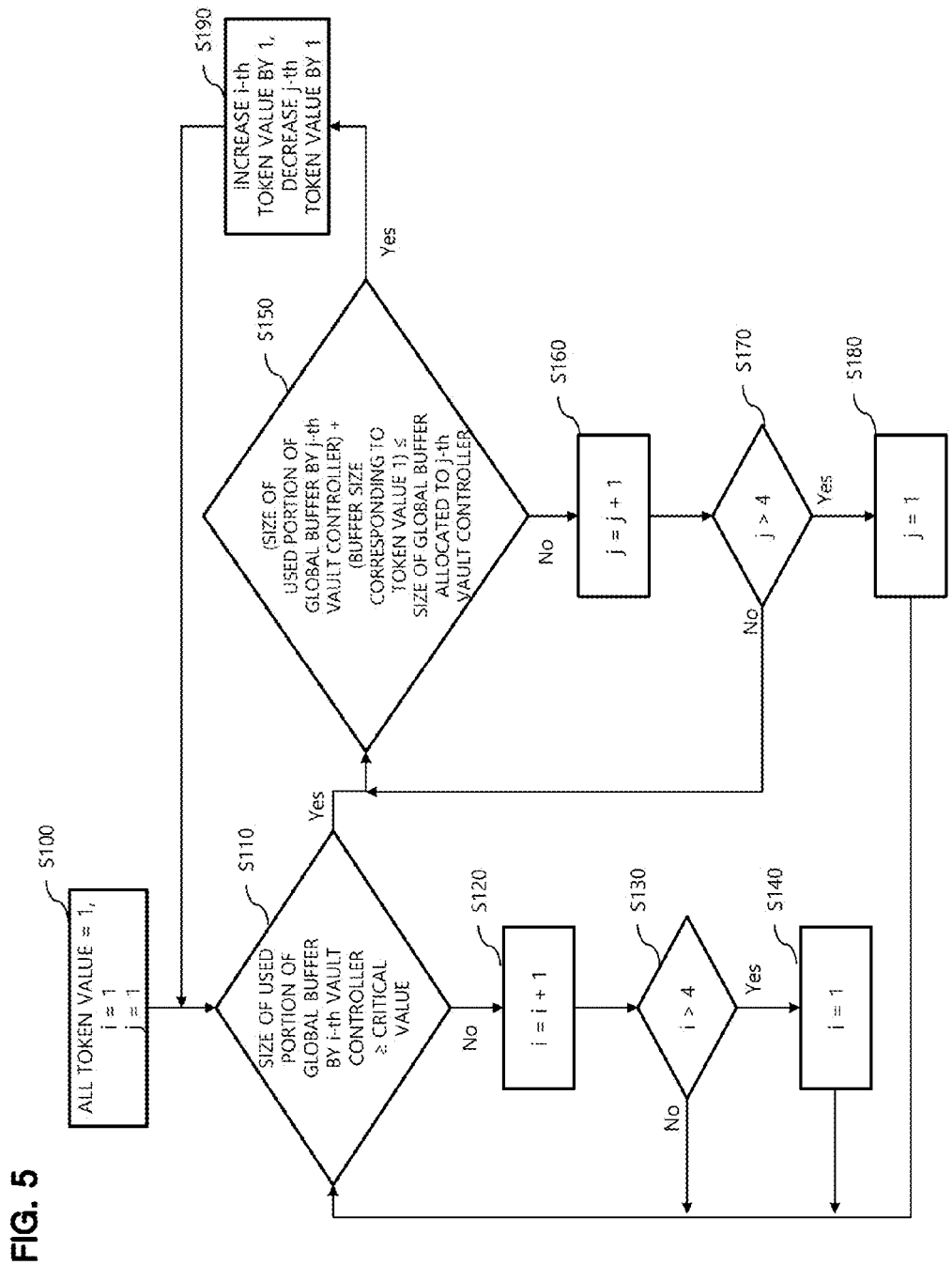
FIG. 5 is a flowchart illustrating an operation of a global buffer controller of FIG. 2.

FIG. 5 is a flowchart illustrating an operation of a global buffer controller according to an embodiment of the present disclosure.

The flowchart of FIG. 5 illustrates an embodiment when a semiconductor device includes four vault controllers. This operation will be described with reference to FIG. 2.

Token values stored in the token registers 213 of the four vault controllers 210 are initialized to 1, and indexes i and j for identifying the four vault controllers 210 are initialized to 1 at S100.

Next, it is checked whether a size of a used portion of the global buffer 202 that is used by an $i^{th}$ vault controller is equal to or greater than a critical value at S110. In an embodiment, the critical value is set to be smaller than a size of an allocated portion of the global buffer 202 that is allocated to the $i^{th}$ vault controller by a certain value, and the certain value may be decided by experiments.

If the size of the used portion of the global buffer 202 is determined to be smaller than the critical value, a value of the index i is increased by 1 at S120, and then it is checked whether the increased value of the index i exceeds 4 which is the maximum value of the index i at S130. In this embodiment, the maximum value corresponds to the number of the vault controllers 210, e.g., 4.

If the increased value of the index i does not exceed the maximum value, the procedure proceeds to S110 in order to adjust a token value of a vault controller 210 corresponding to a next value of the index i. If, instead, the increased value of the index i exceeds the maximum value, the value of the index i is re-initialized to 1 at S140, and step S110 is repeated for a vault controller corresponding to the initialized value of the index i.

As a result of step S110, if the size of the used portion of the global buffer 202 that is used by the $i^{th}$ vault controller 210 is determined to be equal to or greater than the critical value, the procedure proceeds to S150. The critical value may be set to a value proximate to the size of the allocated portion of the global buffer 202 that is allocated to each vault controller 210. Accordingly, the critical values may vary across the vault controllers 210.

At S150, it is checked whether the sum of a size of a used portion of the global buffer 202 that is used by a $i^{th}$ vault controller 210 and a buffer size corresponding to a token value 1 is equal to or smaller than a size of an allocated portion of the global buffer 202 that is allocated to the $j^{th}$ vault controller 210.

That is, at S150, it is checked whether an unused space of the allocated portion of the global buffer 202 that is allocated to the $j^{th}$ vault controller 210 may be provided to the $i^{th}$ vault controller 210, where i is different from j.

If the critical value is set to be sufficiently large, 'Yes' cannot be determined at S150 when the two indexes i and j are equal to each other. Otherwise, when the two indexes i and j are equal to each other, an additional step may also be performed such that step S190 is not performed.

Sizes of allocated portions of the global buffer 202 allocated to the vault controllers 210 may be calculated from the token values of the vault controllers 210. For example, when a total size of the global buffer 202 is 10 KB and the sum of the token values is 10, the token value 1 indicates a size of 1 KB.

When 'Yes' is determined at S150, the token value of the $i^{th}$ vault controller 210 is increased by 1, and the token value of the $j^{th}$ vault controller 210 is decreased by 1. As a result, the token value of the $i^{th}$ vault controller 210 that was initialized to 1 becomes 2, and the token value of the $j^{th}$ vault controller 210 that was initialized to 1 becomes 0. At this time, a portion of the global buffer 202 that corresponds to a token value 1 and has been allocated to the $j^{th}$ vault controller 210 is re-allocated to the $i^{th}$ vault controller 210. In this way, the sum of all the token values may be constantly maintained.

When 'No' is determined at S150, a value of the index j is increased by 1 at S160, and then it is checked whether the value of the index j exceeds the maximum value, e.g., 4, at S170.

If the value of the index j does not exceed the maximum value, the procedure proceeds to step S150 and the aforementioned operations from step S150 are repeated. On the other hand, if the value of the index j exceeds the maximum value, the value of the index j is initialized to 1 at S180, the procedure proceeds to step S110, and the aforementioned operations from step S110 are repeated.

The global buffer controller 201 dynamically adjusts the token values allocated to the vault controllers 210, that is, sizes of allocated portions of the global buffer 202 allocated to the vault controllers 210 that repeatedly perform the operations illustrated in FIG. 5. For example, the global buffer controller 201 automatically increases a size of an allocated portion of the global buffer 202 that is allocated to a specific vault controller 210 when requests inputted from an external device are concentrated on the specific vault controller 210. Consequently, even when the inputted requests are concentrated on the specific vault controller 210, performance deterioration of the semiconductor device due to buffer insufficiency may be prevented.

Figure 6:
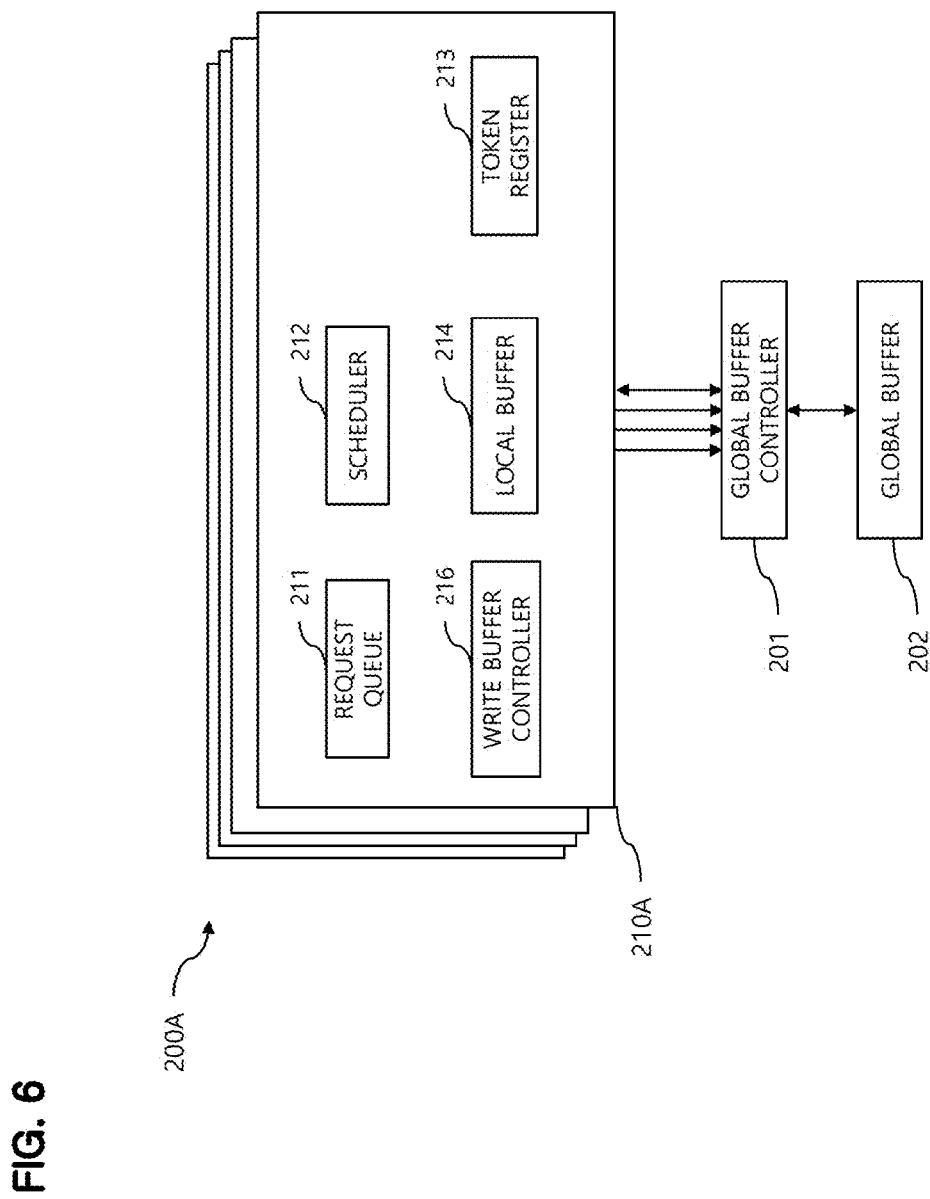
FIG. 6 is a block diagram of a semiconductor device according to another embodiment of the present disclosure.

FIG. 6 is a block diagram of a semiconductor device 200A according to another embodiment of the present disclosure.

The semiconductor device 200A is different from the semiconductor device 200 of FIG. 2 in that the local buffer 214 and the global buffer 202 together operate as a write buffer. The semiconductor device 200A further includes a write buffer controller 216 for controlling the local buffer 214, but it does not include the prefetch controller 215.

The request queue 211, the scheduler 212, and the token register 213 included in each of vault controllers 210A of FIG. 6 are the same as those shown in FIG. 2.

The write buffer controller 216 stores an address corresponding to a write request and write data in the local buffer 214 when there is the write request. When the write request has been processed, the write buffer controller 216 may delete corresponding information, i.e., the address and the write data, in the local buffer 214.

Since the local buffer 214 operating as the write buffer and the write buffer controller 216 for controlling the local buffer 214 are included in a vault controller 210A, a detailed description thereof will be omitted.

In the semiconductor device 200A, data structures of the local buffer 214 and the global buffer 202 are substantially the same as those of FIG. 3 and FIG. 4, and the global buffer controller 201 dynamically controls sizes of portions of the global buffer 202 allocated to the vault controllers 210A, as described above with reference to FIG. 5.

Figure 7:
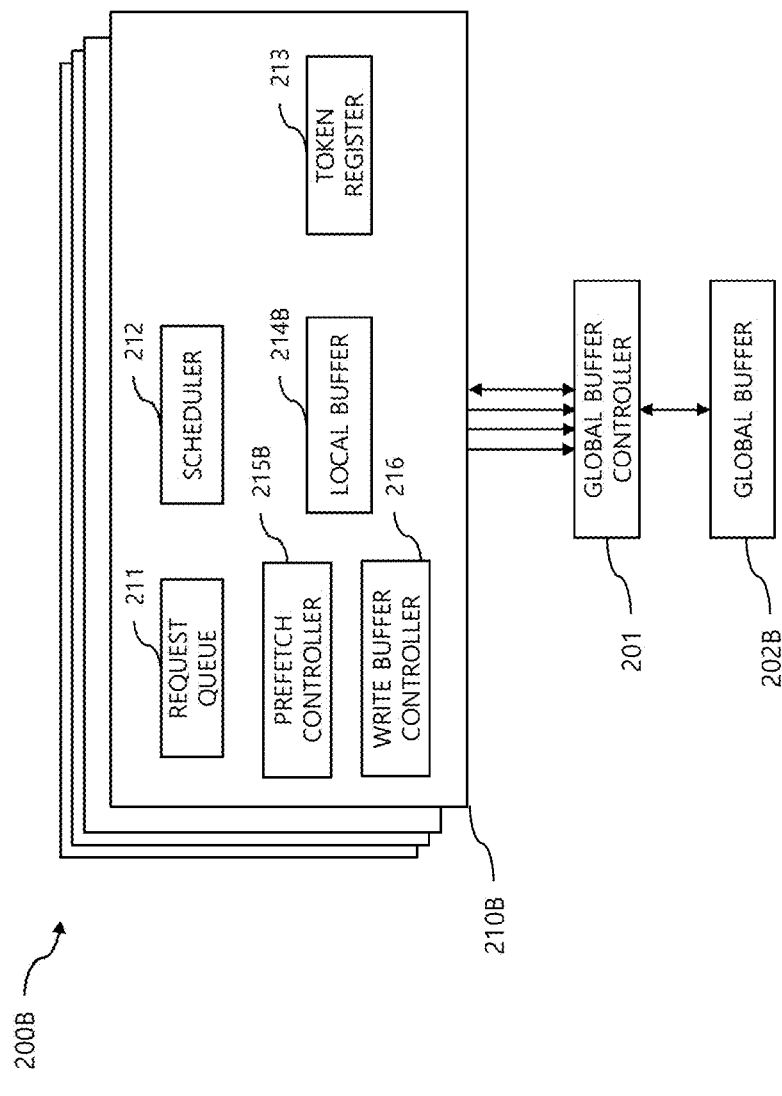
FIG. 7 is a block diagram of a semiconductor device according to still another embodiment of the present disclosure.

FIG. 7 is a block diagram of a semiconductor device 200B according to still another embodiment of the present disclosure.

In FIG. 7, the semiconductor device 200B includes both a prefetch controller 215B and the write buffer controller 216.

The prefetch controller 215B and the write buffer controller 216 in FIG. 7 perform operations that are substantially the same as those described in the embodiments of FIG. 2 and FIG. 6, respectively.

The semiconductor device 200B includes a local buffer 214B and a global buffer 202B, each of which is a hybrid buffer. The hybrid buffer stores, in one data structure, prefetch addresses and prefetched data used in a read operation, and addresses corresponding to write requests and write data used in a write operation.

The request queue 211, the scheduler 212, and the token register 213 included in each of vault controllers 210B are the same as those shown in FIG. 2.

Therefore, as described above with reference to FIG. 5, sizes of portions of the global buffer 202B allocated to the vault controllers 210B are dynamically adjusted by the operation of the global buffer controller 201.

Figure 8:
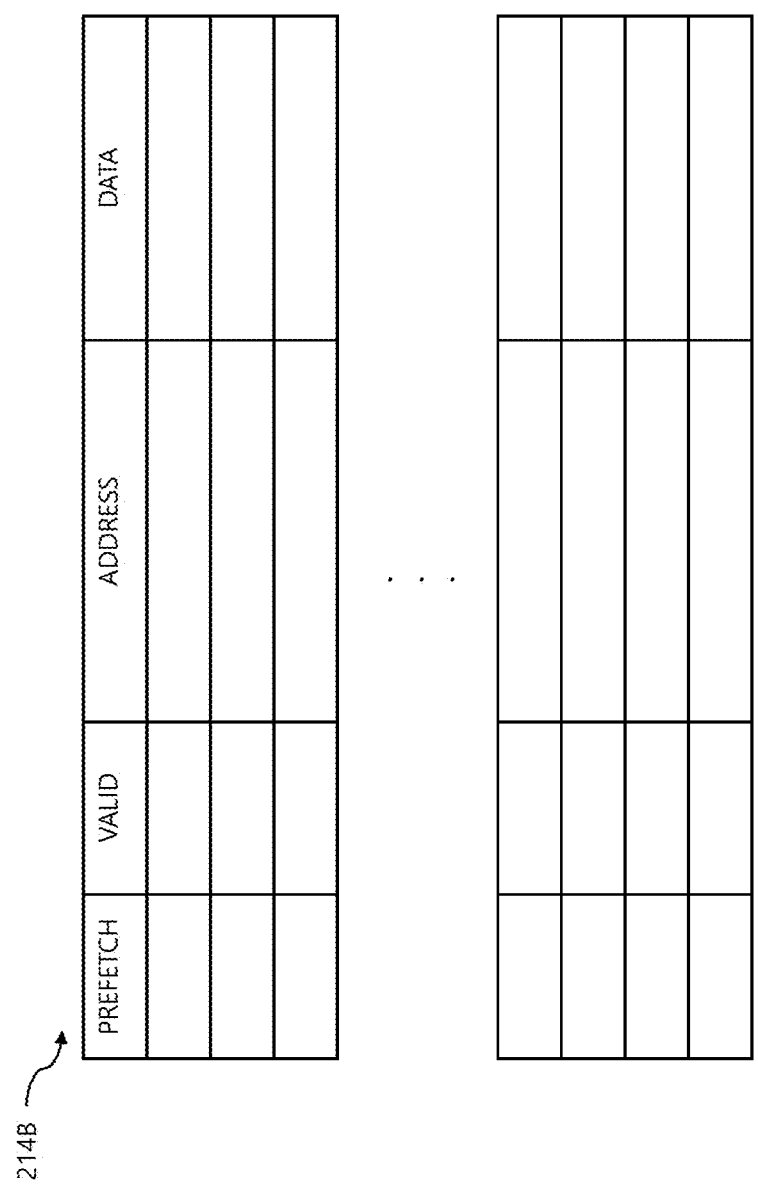
FIG. 8 illustrates a data structure of a local buffer of FIG. 7.

FIG. 8 illustrates a data structure of the local buffer 214B of FIG. 7.

The local buffer 214B includes a prefetch field PREFETCH in addition to the data structure of the local buffer 214 illustrated in FIG. 3. The prefetch field PREFETCH indicates whether a corresponding row operates as a prefetch buffer or a write buffer.

For example, in a row in which the prefetch field PREFETCH has been activated, the address field ADDRESS and the data field DATA store prefetch addresses and prefetched data used in a read operation. On the other hand, in a row in which the prefetch field PREFETCH has not been activated, the address field ADDRESS and the data field DATA store addresses corresponding to write requests and write data used in a write operation.

The valid field VALID indicates whether a corresponding row includes valid information.

Figure 9:
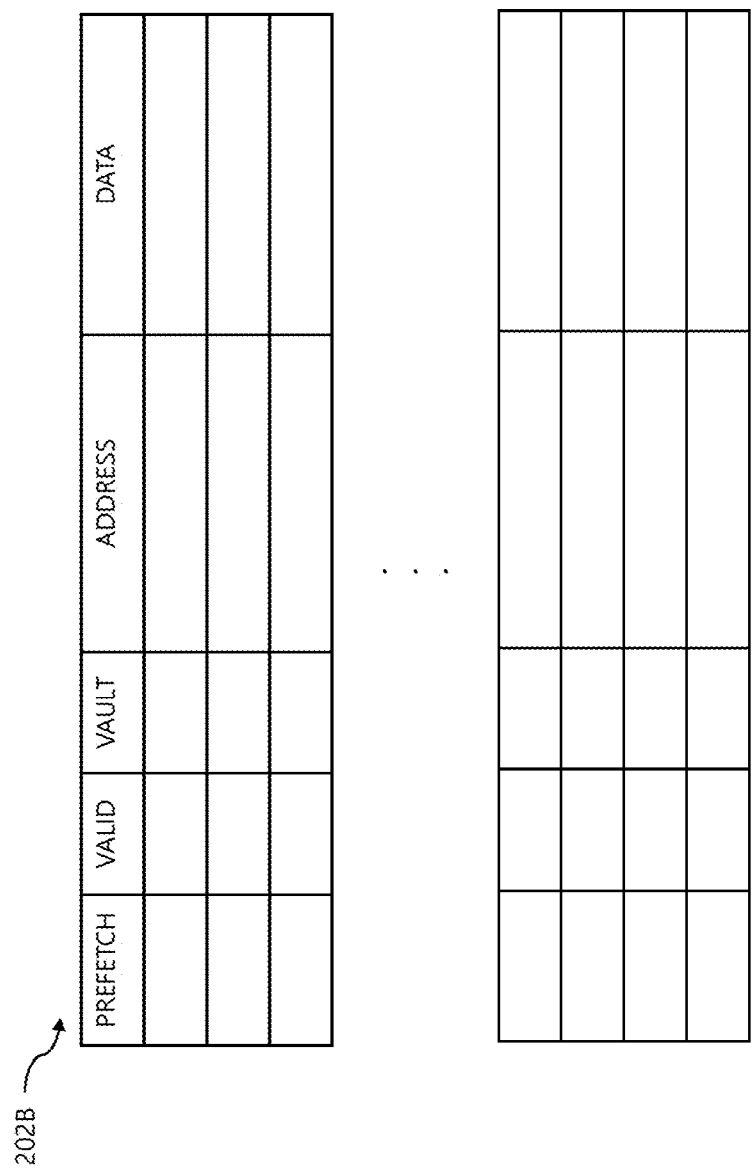
FIG. 9 illustrates a data structure of a global buffer of FIG. 7.

FIG. 9 illustrates a data structure of the global buffer 202B of FIG. 7.

The global buffer 202B includes a vault field VAULT in addition to the data structure of the local buffer 214B illustrated in FIG. 8, and the vault field VAULT indicates a vault controller 210B to which each row has been allocated.

As described above, each of the local buffer 214B of the vault controller 210B, and a portion of the global buffer 202B allocated to the vault controller 210B, is divided into an area used as a prefetch buffer for the read operation and an area used as a write buffer for the write operation. In an embodiment, the prefetch controller 215B may dynamically adjust a ratio of the two areas, i.e., a ratio of the prefetch buffer area to the write buffer area, according to operation states of each vault controller 210B.

Figure 10:
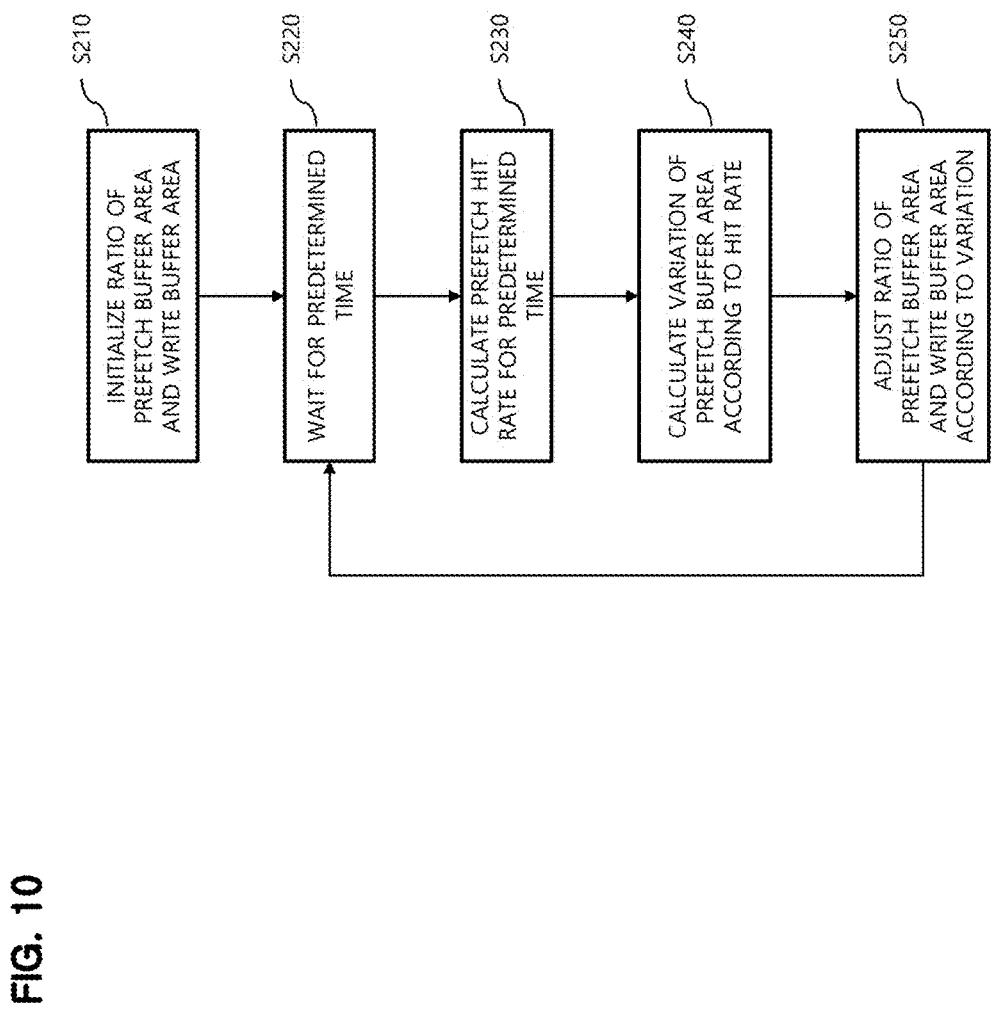
FIG. 10 is a flowchart illustrating an operation of a prefetch controller of FIG. 7.

FIG. 10 is a flowchart illustrating an operation of the prefetch controller 215B of FIG. 7.

The prefetch controller 215B initializes the ratio of the prefetch buffer area to the write buffer area in the local buffer 214B at S210.

After waiting for a predetermined time at S220, the prefetch controller 215B calculates a prefetch hit rate for the predetermined time at S230. The prefetch hit rate may be calculated as a ratio of an amount of prefetched data corresponding to read requests processed for the predetermined time to an amount of data prefetched in the prefetch buffer area for the predetermined time.

Then, the prefetch controller 215B calculates a variation of the prefetch buffer area used according to the prefetch hit rate at S240.

The prefetch controller 215B adjusts a size of the prefetch buffer area according to the variation and accordingly adjusts a size of the write buffer area, thereby adjusting the ratio of the prefetch buffer area to the write buffer area in the local buffer 214 at S250.

Then, the prefetch controller 215B proceeds to step S220 and repeats the aforementioned processes.

In an embodiment, a ratio of the prefetch buffer area to the write buffer area, which corresponds to a specific vault controller 210B, may be commonly applied to the local buffer 214B and the global buffer 202B.

Accordingly, in the global buffer 202B, the ratio of the prefetch buffer area to the write buffer area may be set differently depending on a corresponding vault controller 210B.

FIG. 11 is a table illustrating a relationship between the prefetch hit rate and the ratio of the write buffer area to the prefetch buffer area in an embodiment of the present disclosure.

As illustrated in FIG. 11, in a period in which the prefetch hit rate PE is the highest, e.g., in a range of 85%<PE≤100%, the ratio of the prefetch buffer area is set to be largest, e.g., ⁴⁄₈, and as the prefetch hit rate becomes lower, the ratio of the prefetch buffer area is set to be gradually smaller, wherein '8' represents each of a total size of the local buffer 214B and a total size of the global buffer 202B.

Accordingly, the ratio of the write buffer area is set to be smallest, e.g., ⁴⁄₈, in the period in which the prefetch hit rate PE is the highest, and is set to be largest, e.g., ⁷⁄₈, in a period in which the prefetch hit rate PE is the lowest, e.g., in a range of PE≤25%.

In the present embodiment, the ratio of the write buffer area is set to be minimum 50%.

As described above, in the hybrid buffer, the prefetch buffer area is dynamically adjusted according to the prefetch hit rate, so that it is possible to additionally allocate an unused space as a prefetch buffer area or a write buffer area, resulting in the improvement of performance of the semiconductor device.

Figure 12:
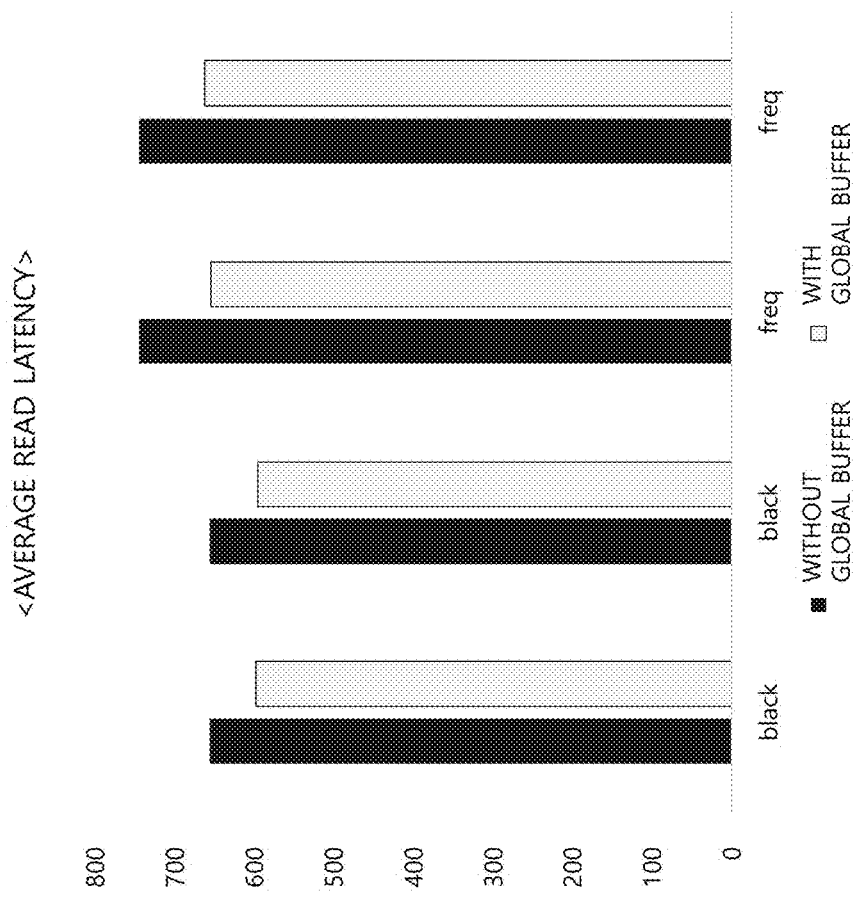
FIG. 12 and FIG. 13 are graphs illustrating effects of embodiments of the present disclosure.

FIG. 12 is a graph illustrating effects of an embodiment of the present disclosure.

A vertical axis denotes average read latency, and a horizontal axis denotes types of traces used in a simulation.

In the graph, dark bars indicate the conventional art in which there is no global buffer, and light bars indicate the embodiment of the present disclosure in which there is a global buffer.

As illustrated in FIG. 12, in the embodiment of the present disclosure, it can be understood that the average read latency of each trace is lower than that of the conventional art, so that the performance of the semiconductor device is improved.

Figure 13:
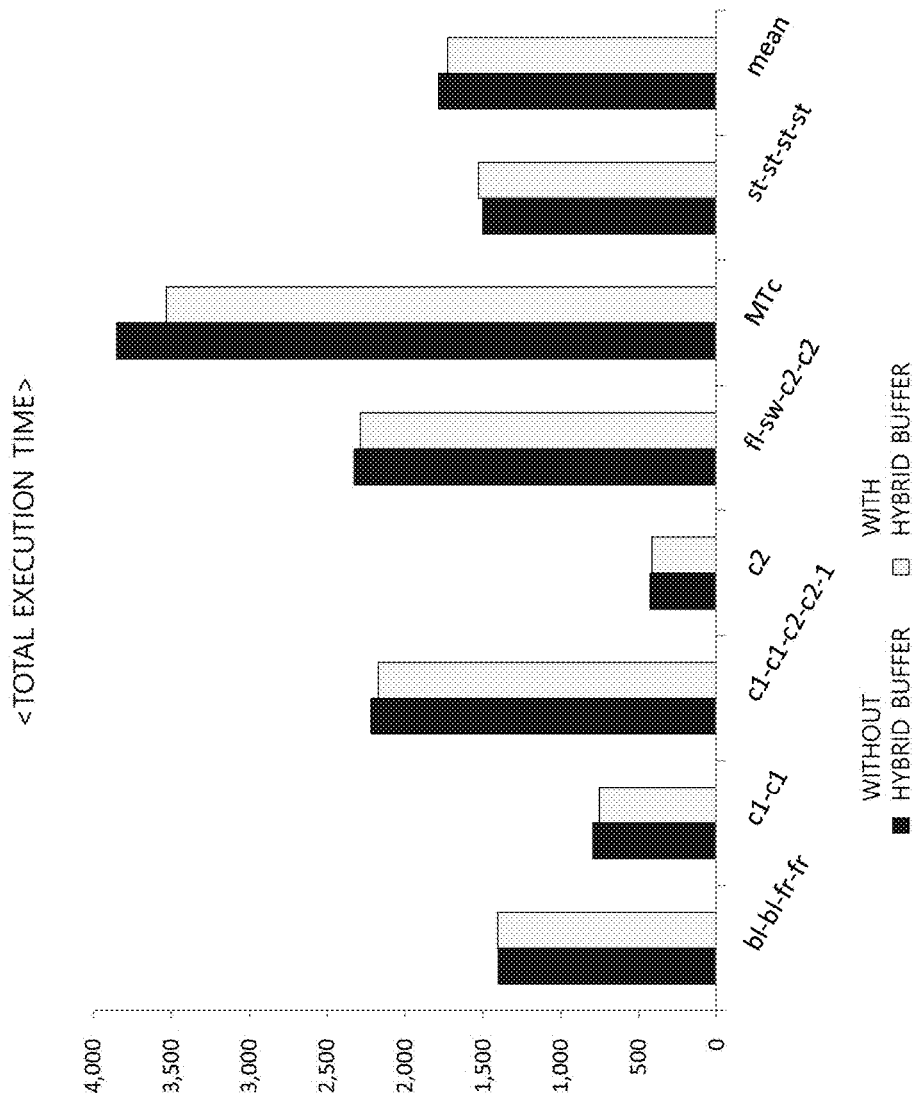

FIG. 13 is another graph illustrating effects of an embodiment of the present disclosure.

A vertical axis denotes a total execution time, and a horizontal axis denotes types of traces used in a simulation.

In the graph, dark bars indicate the conventional art in which a prefetch buffer and a write buffer separately exist, and light bars indicate the embodiment of the present disclosure in which a prefetch buffer and a write buffer exist in the form of one hybrid buffer.

As illustrated in FIG. 13, in the embodiment of the present disclosure, it can be understood that the total execution time is lower in most of traces than that of the conventional art, so that the performance of the semiconductor device is improved.

While certain embodiments have been described above, it will be understood to those skilled in the art that the embodiments described are by way of example only. Accordingly, the semiconductor device described herein should not be limited based on the described embodiments. Rather, the semiconductor device described herein should only be limited in light of the claims that follow when taken in conjunction with the above description and accompanying drawings.

What is claimed is:

1. A semiconductor device comprising:
   a plurality of memory controllers;
   a global buffer including areas respectively allocated to the plurality of memory controllers; and
   a global buffer controller configured to control sizes of the allocated areas of the global buffer, the global buffer directly coupled to the global buffer controller, the global buffer controller coupled to the plurality of memory controller,
   wherein each memory controller includes a local buffer that stores one or both of prefetch data and write data, the prefetch data being prefetched from a memory cell array controlled by the memory controller, the write data being to be written to the memory cell array controlled by the memory controller,
   wherein a storage capacity of the local buffer for storing the prefetch data and the write data is expanded as the global buffer controller allocates a corresponding area of the global buffer to the memory controller,
   wherein the local buffer includes a prefetch buffer area and a write buffer area that are dynamically adjusted,
   wherein each of the plurality of memory controllers further includes a prefetch controller that generates a prefetch request from a read request provided by an external device, the prefetch controller storing a prefetch address and prefetched data corresponding to the prefetch request in the prefetch buffer area,
   wherein each of the plurality of memory controllers further includes a write buffer controller that stores an address and data corresponding to a write request provided from an external device in the write buffer area,
   wherein the prefetch controller adjusts a ratio of the prefetch buffer area to the write buffer area, and
   wherein the local buffer is separate from the global buffer.

2. The semiconductor device according to claim 1, wherein, when a first memory controller of the plurality of memory controllers uses an area of the global buffer that exceeds a preset critical area, the global buffer controller selects a second memory controller from the plurality of memory controllers, the second memory controller having an extra space in an area of the global buffer that is allocated to the second memory controller, and reallocates a part of the extra space to the first memory controller.

3. The semiconductor device according to claim 1, wherein the semiconductor device further comprises:

a register that stores information on areas of the global buffer each of which is allocated to a corresponding memory controller.

4. The semiconductor device according to claim 1, wherein each of the plurality of memory controllers further comprises:

a register that stores information on an area of the global buffer which is allocated to a corresponding memory controller.

5. The semiconductor device according to claim 4, wherein the register stores a token value corresponding to the area of the global buffer that is allocated to the corresponding memory controller, and wherein a sum of token values stored in the registers of the plurality of memory controllers corresponds to a total size of the global buffer.

6. The semiconductor device according to claim 5, wherein the global buffer controller controls the sizes of the allocated areas of the global buffer by adjusting a ratio of the token values stored in the registers of the plurality of memory controllers.

7. The semiconductor device according to claim 1, wherein the prefetch controller increases and decreases a size of the prefetch buffer area according to a prefetch hit rate.

8. The semiconductor device according to claim 7, where, if the prefetch hit rate is higher, the size of the prefetch buffer area is larger while a size of the write buffer area is smaller.

9. The semiconductor device according to claim 7, wherein the prefetch hit rate corresponds to a ratio of an amount of prefetched data corresponding to read requests processed for a predetermined time, to an amount of data prefetched in the prefetch buffer area for the predetermined time.

10. The semiconductor device according to claim 7, wherein the prefetch controller decreases the size of the prefetch buffer area when the prefetch hit rate is lowered.

11. The semiconductor device according to claim 1, wherein each of the plurality of memory controllers further comprises:

a request queue that stores read and write requests provided from an external device; and a scheduler that determines a processing order of the read and write requests stored in the request queue to select a request to be processed from the read and write requests.

* * * * *